United States Patent
Malmgren et al.

[11] Patent Number: 5,801,520
[45] Date of Patent: Sep. 1, 1998

[54] SUPPLY VOLTAGE SWITCHING APPARATUS

[75] Inventors: Carl-Henrik Malmgren, Stockholm; Hans Oskar Eriksson, Järfälla; Henrik Helmer Hellberg, Solna, all of Sweden

[73] Assignee: Telefonaktiebolaget LM Ericsson, Stockholm, Sweden

[21] Appl. No.: 836,225

[22] PCT Filed: Nov. 8, 1995

[86] PCT No.: PCT/SE95/01323

§ 371 Date: May 7, 1997

§ 102(e) Date: May 7, 1997

[87] PCT Pub. No.: WO96/15617

PCT Pub. Date: May 23, 1996

[30] Foreign Application Priority Data

Nov. 10, 1994 [SE] Sweden ................. 9403876

[51] Int. Cl.⁶ ........................................ G05F 1/56
[52] U.S. Cl. ........................................ 323/270
[58] Field of Search ........................ 323/266, 267, 323/270, 273, 281

[56] References Cited

U.S. PATENT DOCUMENTS

| | | |
|---|---|---|
| 3,889,173 | 6/1975 | Klusmann et al. |
| 4,617,473 | 10/1986 | Bingham . |
| 4,694,430 | 9/1987 | Rosier . |
| 5,335,272 | 8/1994 | Löfmark et al. |
| 5,369,472 | 11/1994 | Raj et al. |
| 5,579,196 | 11/1996 | Pezzini . |

FOREIGN PATENT DOCUMENTS

| | | |
|---|---|---|
| 440 006 A1 | 8/1991 | European Pat. Off. . |
| 440 006 B1 | 8/1991 | European Pat. Off. . |
| 585 115 A2 | 3/1994 | European Pat. Off. . |

*Primary Examiner*—Matthew V. Nguyen
*Attorney, Agent, or Firm*—Burns, Doane, Swecker & Mathis, L.L.P.

[57] ABSTRACT

An apparatus for automatically switching a load between different supply voltages in dependence on varying voltage demands of the load includes a number of analog series regulators. The supply voltage connection terminals of the series regulators are connected to an individual one of the supply voltages while the output terminals of the series regulators are connected to the load to individually conduct current to/from the load in one and the same direction. The reference voltage input terminals of the series regulators are supplied with an individual reference voltage in response to the voltage demand of the load in such a manner that a series regulator connected to a supply voltage of a large absolute value is adapted to be supplied with a reference voltage of a smaller absolute value than a series regulator connected to a supply voltage of a smaller absolute value and strive to output voltage on its output terminal, which is of a smaller absolute value than the output voltage which a series regulator connected to a supply voltage of a smaller absolute value strives to output.

6 Claims, 1 Drawing Sheet

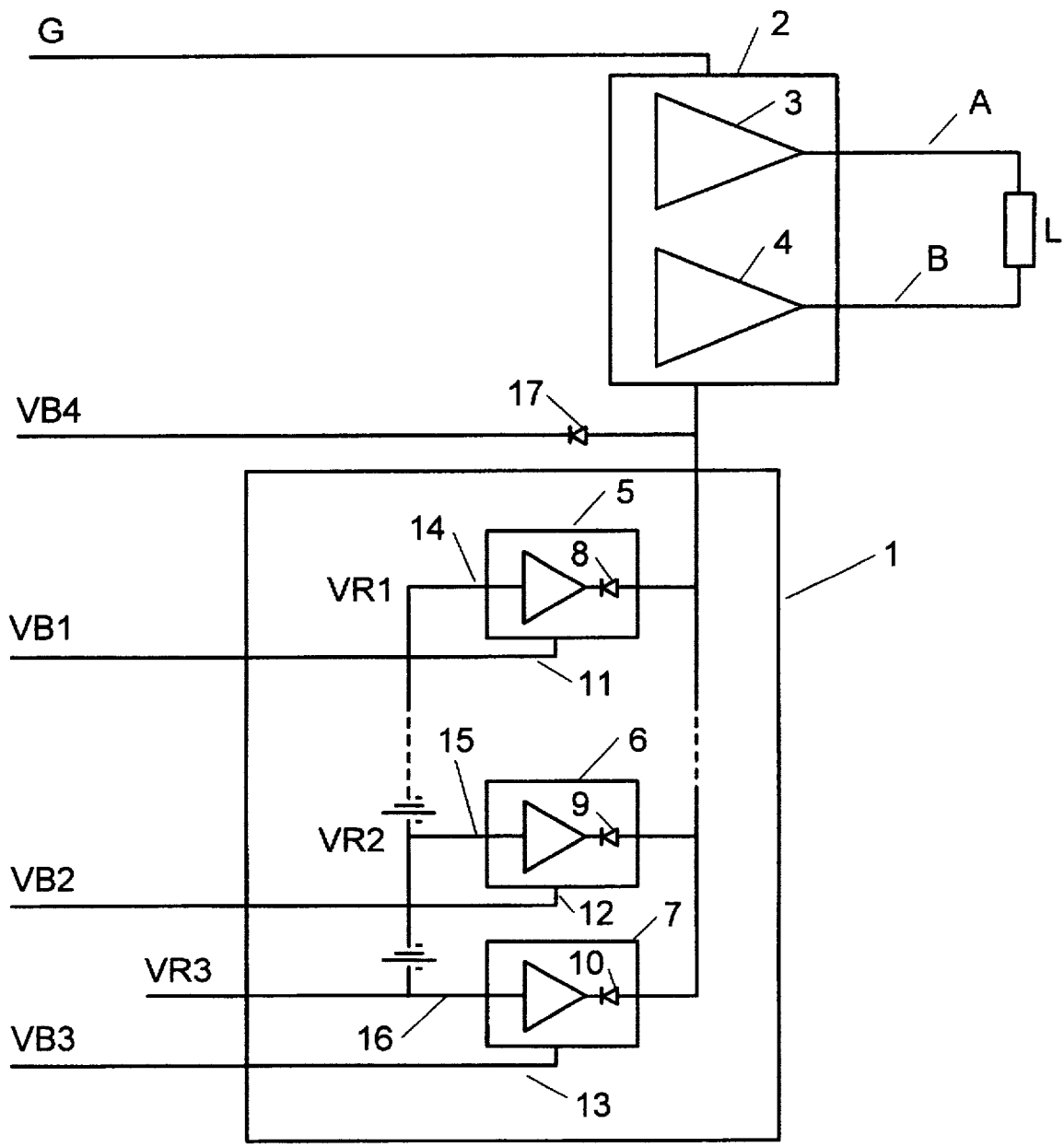

SUPPLY VOLTAGE SWITCHING APPARATUS

TECHNICAL FIELD

The invention relates to an apparatus for automatically switching a load between different supply voltages in response to varying voltage demands of the load.

BACKGROUND

A subscriber line interface circuit (SLIC) which is to supply a two-wire circuit, has a feeding characteristic that makes the line voltage as well as the line current a function of the line load.

When the line is open, it is supplied with maximum voltage at the same time as the current is zero. In order for the SLIC to function, it must have access to a supply voltage which is somewhat higher than the required line voltage.

When the line is closed, i.e. when the line is loaded, the line voltage will decrease and the line current will increase in dependence on the sum of the resistances of the line and the load.

The difference between the supply voltage and the line voltage will be applied across the SLIC through which the line current flows. This causes power dissipation in the SLIC.

The power dissipation in the SLIC will be highest for short lines, i.e. for a low total resistance value of the line and the load.

In many cases, one accepts the power dissipation in the SLIC. In certain cases, a DC/DC converter can be utilized in each line in order to keep the maximum power loss low. The output voltage from the respective converter is then controlled continuously in order to be adapted to the present line load. However, the utilization of such converters causes certain disadvantages in the form of interfering radiation and an increased circuit complexity.

By having access to a plurality of different supply voltages, the power losses in the SLIC can be reduced by switching to the supply voltage which, for the moment, has the lowest adequate absolute value.

It is known to utilize a switch in order to apply a suitable supply voltage. However, such a solution requires that the decision-level for the switching between different voltages has a certain hysteresis so that one does not end up in a situation where the switches merely switch back and forth all the time. Moreover, the switching between different voltages causes a stepwise change of the supply voltage to the driving amplifiers of the SLIC, which causes disturbances.

SUMMARY

The object of the invention is to provide a supply voltage switching apparatus which does not exhibit the disdvantages stated above, and which minimizes the power loss in a load having varying voltage demands.

This is attained by the apparatus according to the invention for automatically switching a load between different supply voltages in response to varying voltage demands of the load, mainly, in that it comprises a number of analog series regulators, the supply voltage connection terminals of which to be connected to an individual one of said supply voltages, the output terminals of which to be connected to the load to individually conduct current to/from the load in one and the same direction, and the reference voltage input terminals of which to be supplied with an individual reference voltage in response to the voltage demand of the load in such a manner that a series regulator connected to a supply voltage of a larger absolute value, is adapted to be supplied with a reference voltage of a smaller absolute value than a series regulator connected to a supply voltage of a smaller absolute value and, hereby, strive to output an output voltage on its output terminal, which is of a smaller absolute value than the output voltage which a series regulator connected to a supply voltage of a smaller absolute value strives to output.

BRIEF DESCRIPTION OF THE DRAWING

The invention will be described more in detail below with reference to the appended drawing on which the single FIGURE shows an embodiment of an apparatus according to the invention at a load in the form of a schematically indicated SLIC.

DETAILED DESCRIPTION

On the drawing, 1 generally denotes an apparatus for automatically switching a load between a predetermined number of different supply voltages in response to varying voltage demands of the load.

In the embodiment shown, the load comprises a schematically illustrated SLIC 2, having two output amplifiers 3 and 4 for supplying a subscriber line having two wires A and B, which at the other end are connected to a subscriber's station L.

The SLIC 2 is connected between ground G and the switching apparatus 1 according to the invention.

In the embodiment shown, the switching apparatus 1 comprises three analog series regulators 5, 6 and 7, but as indicated by a dashed line, there may be more than three series regulators. It should be pointed out that, of course, there may also be fewer than three series regulators. The output terminals of the series regulators 5, 6 and 7 are connected to the SLIC 2, and are adapted to individually conduct current to/from the SLIC 2 in one and the same direction. This function is represented by diodes 8, 9 and 10, respectively, in the embodiment shown.

Each series regulator 5, 6 and 7 has a supply voltage connection terminal 11, 12 and 13, respectively, to be connected to an individual supply voltage VB1, VB2 and VB3, respectively.

VB3 is the supply voltage having the largest absolute value. In this embodiment, VB3 is supposed to be −48V, i.e. equal to battery voltage. The absolute values of the supply voltages VB2 and VB1 are, in this case, predeterminedly lower than the supply voltage VB3 and are e.g. −30V and −15V, respectively.

Moreover, each series regulator 5, 6 and 7 has a reference voltage input terminal 14, 15 and 16, respectively, to be supplied, in this embodiment, with an individual, negative reference voltage VR1, VR2 and VR3, respectively, in response to the demand of negative voltages of the SLIC 2.

In the embodiment shown, VR3 corresponds to the desired negative SLIC voltage, while the reference voltages VR2 and VR1 correspond to voltages whose absolute values are predeterminedly larger than VR3, e.g. VR2=VR3−0.5V and VR1=VR3−1.0V, as schematically indicated by battery cells on the drawing. Thus, VR2 is more negative than VR3, while VR1 is more negative than both VR3 and VR2 in this embodiment in which negative voltages are used.

Thus, in accordance with the invention, a series regulator connected to a supply voltage of a larger absolute value, is supplied with a reference voltage of a smaller absolute value than a series regulator connected to a supply voltage of a smaller absolute value.

In the embodiment shown, the series regulator 7 which is connected to the supply voltage VB3 having the largest absolute value, will strive to output, on its output terminal, an output voltage to the SLIC 2, which has a lower absolute value than the output voltages the other series regulators 5 and 6 strive to output. The series regulator 6 which is connected to the supply voltage VB2 having the next largest absolute value, will strive to output, on its output terminal, an output voltage to the SLIC 2, whose absolute value is next smallest of the output voltages the other series regulators 5 and 7 strive to output. In a corresponding manner, the series regulator 5 which, in the embodiment shown, is connected to the supply voltage VB1 having the lowest absolute value of the supply voltages VB1, VB2 and VB3, will strive to output, on its output terminal, an output voltage to the SLIC 2, whose absolute value is larger than the output voltages the other series regulators 6 and 7 strive to output.

In this connection, it should be noted that a series regulator, of course, cannot, on its output terminal, output a voltage which exceeds the supply voltage applied to its supply voltage connection terminal.

As will be apparent from the below examples, the output amplifiers of the SLIC 2 will, thus, be supplied with different supply voltages VB1, VB2 and VB3 by means of the switching apparatus 1 according to the invention. The current from the SLIC 2 in the embodiment shown, will automatically flow to the supply voltage having the lowest adequate absolute value. Hereby, the power losses in the SLIC 2 will be minimized.

Thus, the current from the SLIC 2 will commutate between the series regulators 5, 6 and 7 so that it, for each output voltage, will flow through the series regulator giving the lowest power loss.

As will be apparent from the below examples, when transferring from one series regulator to the other, there is a narrow voltage range in which both series regulators will be conducting at the same time. Hereby, a continuous transfer is obtained and, consequently, practically no disturbances will appear.

In accordance with the invention, the output voltage from the switching apparatus 1 to the SLIC 2 may be clamped by means of a clamp diode 17 to a chosen voltage VB4 whose absolute value is lower than the supply voltages VB1, VB2 and VB3. If the desired value of the voltage across the SLIC 2, i.e. the reference voltage VR3, is lower than the voltage VB4, the current from the SLIC 2 will flow through the clamp diode 17 and the input voltage to the SLIC 2 will be clamped, i.e. locked, to VB4.

In this connection, it should be pointed out that the supply voltage switching apparatus according to the invention, in its simplest form (not shown), comprises only one series regulator and a clamp diode. In that case, only two supply voltages would be switched to the SLIC.

The function of the switching apparatus 1 will be described more in detail below with reference to four different voltage demands of the SLIC 2.

As above, it is supposed that VB3=−48V, VB2=−30V and VB1=−15V.

As stated above, the absolute value of the supply voltage VB4 is lower than the absolute values of the supply voltages VB1, VB2 and VB3. In view hereof, suppose that VB4=−10V.

As also apparent from the above, the reference voltage VR3 equals the desired value of the voltage demand of the SLIC 2, while the reference voltage VR2=VR3−0.5V and VR1=VR3−1.0V in this embodiment.

EXAMPLE 1

Suppose that the voltage demand of the SLIC 2 is −8V, i.e. VR3=−8V.

As a consequence, VR2=−8.5V and VR1=−9V in accordance with the above.

The voltages on the output terminals of the series regulators 7, 6 and 5, i.e. on the cathodes of the diodes 10, 9 and 8, respectively, will therefore be −8V, −8.5V and −9V, respectively.

The voltage on the cathode of the clamp diode 17 is constantly VB4, i.e. −10V.

In this example, the clamp diode 17 whose cathode is at the lowest voltage, will be forward-biased at the same time as all of the diodes 8, 9 and 10 will be reverse-biased. The voltage in the interconnection point between the switching apparatus 1, the anode of the clamp diode 17 and the SLIC 2 will, thus, be −10V and the current from the SLIC 2 will consequently flow through the forward-biased clamp diode 17 to VB4. Thus, none of the series regulators 5, 6 and 7 will conduct any current.

In this example, the voltage across the SLIC 2 will be 10V. If neither the switching apparatus 1 nor the clamp diode 17 were present, the supply voltage to the SLIC 2 would have been −48V, and consequently, the voltage drop across the SLIC 2 would have been 48V which, of course, would have caused a much higher power loss in the SLIC 2.

EXAMPLE 2

Suppose that the voltage demand of the SLIC 2 changes to −12V, i.e. VR3=−12V.

As a consequence, VR2=−12.5V and VR1=−13V in accordance with the above.

The voltages on the output terminals of the series regulators 7, 6 and 5, i.e. on the cathodes of the diodes 10, 9 and 8, respectively, will therefore be −12V, −12.5V and −13V, respectively.

The voltage on the cathode of the clamp diode 17 is still constantly −10V.

The lowest voltage is now applied to the cathode of the diode 8 which, consequently, becomes forward-biased at the same time as all of the diodes 17, 9 and 10 become reverse-biased. The voltage in the interconnection point between the switching apparatus 1, the anode of the clamp diode 17 and the SLIC 2 will, therefore, be −13V and the current from the SLIC 2 will, consequently, flow through the diode 8 to VB1.

Thus, in this case, a single series regulator conducts current, namely, the series regulator 5.

By the changed voltage demand from −8V to −12V, the supply voltage supply will, thus, shift from VB4 to VB1.

In this example, the voltage drop across the SLIC 2 will be 13V, while the voltage drop across the series regulator 5 will be 2V.

Also in this case, the current from the SLIC 2 will flow to the supply voltage having the lowest adequate absolute value, namely VB1=−15V.

EXAMPLE 3

Suppose that the voltage demand of the SLIC 2 becomes −14.5V, i.e. VR 3=−14.5V

As a consequence, VR2=−15V and VR1=−15.5V.

The voltages on the output terminals of the series regulators 7 and 6, i.e. on the cathodes of the diodes 10 and 9, will, therefore, be −14.5V and −15V, respectively, while the series regulator 5 which strives to output −15.5V on its output terminal, cannot output more than −15V, i.e. the supply voltage VB1. Thus, the voltage on the cathode of the diode 8 will be −15V, i.e. the same as on the cathode of the diode 9.

The voltage on the cathode of the clamp diode 17 is still constantly −10V.

The cathodes of the diodes 8 and 9 now both are at the lowest voltage and, consequently, these diodes become forward-biased at the same time as the diodes 17 and 10 both become reverse-biased.

Thus, the voltage in the interconnection point between the switching apparatus 1, the anode of the clamp diode 17 and the SLIC 2 will be −15V.

Consequently, in this case, the current from the SLIC 2 will be divided between the diodes 8 and 9 and will flow to both VB1 and VB2.

Thus, both series regulators 8 and 9 will conduct current in this example.

By the change of the voltage demand from −12V to −14.5V, the supply voltage supply will shift from VB1 to VB1+VB2.

EXAMPLE 4

Suppose that the voltage demand of the SLIC 2 becomes −35V, i.e. VR3=−35V.

As a consequence, VR2=−35.5V and VR1=−36V.

The voltage on the output terminal of the series regulator 7, i.e. on the cathode of the diode 10, will be −35V.

The series regulator 6 will strive to output −35.5V on its output terminal, i.e. on the cathode of the diode 9, but cannot output more than −30V, i.e. VB2, and, consequently, the voltage on the cathode of the diode 9 will be −30V.

The series regulator 5 will strive to output −36V on its output terminal, i.e. on the cathode of the diode 8, but cannot output more than −15V, i.e. VB1, and consequently, the voltage on the cathode of the diode 8 will be −15V.

The voltage on the cathode of the clamp diode 17 is still constantly −10V.

Thus, in this example, the diode 10 whose cathode is at the lowest voltage, will be forward-biased at the same time as all of the diodes 17, 8 and 9 become reverse-biased. The voltage at the interconnection point between the switching apparatus 1, the anode of the clamp diode 17 and the SLIC 2 will therefore be −35V and the current from the SLIC 2 will flow through the diode 10 to VB3.

Thus, only the series regulator 7 will conduct current from the SLIC 2.

In this example, the voltage drop across the SLIC 2 will be 35V, while the voltage drop across the series regulator 7 will be 13V.

Thus, the change of the voltage demand from −14.5V to −35V will cause the supply voltage supply to shift from VB1+VB2 to VB3.

As should be apparent from the above examples, the power loss in the SLIC 2 will be considerably reduced by means of the switching apparatus according to the invention in comparison with the case when a supply voltage of −48V is constantly applied across the SLIC 2.

It should also be apparent to anyone skilled in the art that even if the apparatus according to the invention has been described in connection with a load which demands negative supply voltages, it will function equally well for loads which demand positive supply voltages, i.e. currents flowing to the loads. In such cases, the reference voltage VR3 would of course be positive, and the reference voltages VR2 and VR1 would e.g. equal VR3+0.5V and VR3+1.0V, respectively.

What is claimed is:

1. An apparatus for automatically switching a load between different supply voltages in response to varying voltage demands of the load, comprising:

a number of analog series regulators having respective supply voltage connection terminals to be connected to an individual one of said supply voltages and having respective output terminals to be connected to the load to individually conduct current to/from the load in one and the same direction, and having respective reference voltage input terminals to be supplied with an individual reference voltage in response to the voltage demand of the load in such a manner that a series regulator connected to a supply voltage of a larger absolute value is adapted to be supplied with a reference voltage of a smaller absolute value than a series regulator connected to a supply voltage of a smaller absolute value and, thereby, strive to output an output voltage on its output terminal that is of a smaller absolute value than the output voltage which a series regulator connected to a supply voltage of a smaller absolute value strives to output.

2. The apparatus of claim 1, wherein the series regulator connected to the supply voltage of the largest absolute value is adapted to be supplied with a reference voltage corresponding to the desired value of the voltage demand of the load.

3. The apparatus of claim 1, wherein the number of series regulators is the same as the number of supply voltages.

4. The apparatus of claim 1, wherein the number of series regulators is one less than the number of supply voltages.

5. The apparatus of claim 4, wherein a voltage clamp is adapted to be connected between the load and the supply voltage having the lowest absolute value and to conduct current to/from the load in the same direction as the series regulators.

6. The apparatus of claim 5, wherein the voltage clamp is a clamp diode.

* * * * *